(12) United States Patent
Shin et al.

(10) Patent No.: US 7,217,115 B2
(45) Date of Patent: May 15, 2007

(54) HIGH SPEED DIRECT MOLD CLAMPING APPARATUS OF AN INJECTION MOLDING MACHINE

(75) Inventors: Sung Chul Shin, Seoul (KR); Young Jin Park, Gyeonggi-do (KR); Jin Young Kim, Gyeonggi-do (KR); Dong Sung Kim, Gyeonggi-do (KR); Han Soo Jeon, Gyeonggi-do (KR); Kyoung Hun Han, Gyeonggi-do (KR)

(73) Assignee: LG Cable Ltd., Seoul (KR)

( * ) Notice: Subject to any disclaimer, the term of this patent is extended or adjusted under 35 U.S.C. 154(b) by 371 days.

(21) Appl. No.: 10/807,756

(22) Filed: Mar. 24, 2004

(65) Prior Publication Data

US 2004/0191361 A1    Sep. 30, 2004

(30) Foreign Application Priority Data

Mar. 29, 2003   (KR) .................... 10-2003-0019808

(51) Int. Cl.
*B29C 45/67* (2006.01)

(52) U.S. Cl. ................. 425/171; 425/192 R; 425/590; 425/595

(58) Field of Classification Search ................ 425/171, 425/192 R, 451.2, 589, 590, 595
See application file for complete search history.

(56) References Cited

U.S. PATENT DOCUMENTS

| 3,656,877 A | * | 4/1972 | Aoki | ........................... 425/590 |
| 4,645,443 A | * | 2/1987 | Aoki | ........................... 425/595 |
| 4,861,259 A | * | 8/1989 | Takada | ..................... 425/451.2 |
| 4,925,618 A | * | 5/1990 | Takada | ........................ 425/590 |
| 4,981,426 A | * | 1/1991 | Aoki | ........................... 425/590 |
| 6,394,787 B1 | * | 5/2002 | Kobayashi | .................. 425/590 |

FOREIGN PATENT DOCUMENTS

| EP | 0 281 329 B1 | 2/1988 |
| EP | 0 311 269 B1 | 9/1988 |
| JP | 4-216906 | * 8/1992 |

* cited by examiner

*Primary Examiner*—James P. Mackey
(74) *Attorney, Agent, or Firm*—Thomas R. FitzGerald, Esq.; Hiscock & Barclay, LLP

(57) ABSTRACT

The present invention relates to a high speed direct mold clamping apparatus. The direct mold clamping apparatus has a grooved channel for the flow of oil inside a clamping cylinder to minimize the flow of oil between inside and outside the clamping cylinder. Then, the clamping ram can perform high speed reciprocation in the clamping cylinder.

16 Claims, 14 Drawing Sheets

HIGH SPEED DIRECT MOLD CLAMPING APPARATUS OF AN INJECTION MOLDING MACHINE

CROSS REFERENCE TO RELATED APPLICATION

This application claims the benefit of the filing date of Korean Patent Application No. 10-2003-0019808, filed Mar. 29, 2003.

BACKGROUND OF THE INVENTION

1. Field of the Invention

The present invention relates to a high speed direct mold clamping apparatus, more particularly, in which a grooved channel for the flow of oil is formed inside a clamping cylinder so that the clamping ram can perform high speed reciprocation in the clamping cylinder.

2. Background of the Related Art

An injection molding machine includes an injection apparatus for injecting molten resin into a mold and a mold clamping apparatus for pressing a mold not to be open during injection and cooling.

The mold clamping apparatus opens/closes a first mold attached to a moving platen with respect to a second mold installed in a stationary platen, and exerts clamping force to the closed mold. Such mold clamping apparatuses are classified into a toggle-type, a direct pressure type, a mechanical locking type and so on. The direct pressure type or direct mold clamping apparatus drives a clamping ram under the hydraulic pressure generated from a clamping cylinder to shift a moving platen and apply clamping force to the mold.

FIG. 1 is a side sectional view illustrating a conventional direct mold clamping apparatus of an injection molding machine. As shown in FIG. 1, a conventional direct mold clamping apparatus of an injection molding machine includes a clamping cylinder 100, a clamping ram 110 slidably coupled with the clamping cylinder 100 and having a column-shaped booster cylinder 112 therein, a moving platen 120 fixed to one end of the clamping ram 110 and having a moving mold 122 attached thereto, a stationary platen 130 fixed opposite to the moving platen 120 and having a stationary mold 132 attached thereto, a plurality of tie bars 140 coupled with the moving platen 120 and stationary platen 130 and for guiding the moving platen 120, a booster ram 150 slidably coupled with the booster cylinder 112 of the clamping ram 110 and fixed to the clamping cylinder 100 and a prefill valve 160 movably installed in one end of the clamping cylinder 100 to open/close the port 104.

The clamping cylinder 100 has first to fourth ports 102, 104, 106 and 108 for allowing the flow of oil. The first port 102 is connected with the booster ram 150 fixed to the clamping cylinder 100, the second port 104 is leaded into the clamping cylinder 100, the third port 106 is connected with the prefill valve 160 for opening/closing the entrance of the second port 104 connected with the clamping cylinder 100, and the fourth port 108 is leaded into the clamping cylinder 100 at the other portion of the clamping ram 110. A channel 151 is formed inside the booster ram 150 in a longitudinal direction of the booster ram 150.

The operation of the direct mold clamping apparatus will be described in conjunction with the drawings as follows.

FIG. 2A is a side sectional view illustrating the mold clamping apparatus shown in FIG. 1 in which the mold is opened, FIG. 2B is a side sectional view illustrating the mold clamping apparatus shown in FIG. 1 in which the moving platen is advancing forward, FIG. 2C is a side sectional view illustrating the mold clamping apparatus shown in FIG. 1 in which the mold is closed, and FIG. 2D is a side sectional view illustrating the mold clamping apparatus shown in FIG. 1 in which the moving platen is returning.

As shown in FIG. 2A, the mold clamping apparatus in the initial position has the moving platen 120 detached from the stationary platen 130.

As shown in FIG. 2B, the moving platen 120 fixed to the clamping ram 110 moves toward the stationary platen 130 to close the molds 122 and 132 where molten resin are discharged. In this stage, oil is introduced through the first port 102, and flows into the booster cylinder 112 through the channel 151 in the booster ram 150. Then, oil in the booster cylinder 112 presses the clamping ram 110 to move within the clamping cylinder 100. As a result, the moving platen 120 coupled with the clamping ram 110 is shifted toward the stationary platen 130. As the clamping cylinder 100 is vacuumized in response to the movement of the clamping ram 110, oil is introduced from an external oil tank through the second port 104 leaded into the clamping cylinder 100.

As shown in FIG. 2C, when the moving platen 120 arrives at the stationary platen 130 thereby closing the mold, high pressure oil is fed through the third port 106. Oil fed through the third port 106 presses the prefill valve 160 to shift the same closing the second port 104. In a position that the second port 104 is closed, high pressure within the clamping cylinder 100 induced by the oil through the channel in the prefill valve 160 make the moving platen 120 coupled with the clamping ram 110 apply clamping force to the molds 122 and 132.

As shown in FIG. 2D, after completing a injection and cooling, feeding oil through the first and third ports 102 and 106 is stopped. At the same time, when high pressure oil is flown through the fourth port 108 into the clamping cylinder 100, the prefill valve 160 retreats to open the second port 104 and shift the clamping ram 110 backward. As a result, oil is returned from the inside of the clamping cylinder 100 via the first to third ports 102, 104 and 106 to the original storages.

However, the conventional mold clamping apparatus has a problem of complicated structure owing to the prefill valve 160 and the ports 102 and 106 for operating the prefill valve 160, which in turn raises the cost of the mold clamping apparatus.

Further, when the clamping ram 110 is advancing forward, negative pressure within the clamping cylinder 100 introduces oil from the external oil tank. However, the suction of oil via the negative pressure shakes the oil level in the oil tank, which causes error in the control of oil.

FIG. 3 is a side sectional view illustrating a conventional mold clamping apparatus with a closed channel. As shown in FIG. 3, the conventional mold clamping apparatus is characterized in that holes 202 and 204 are formed at both sides inside a clamping cylinder 200 where a clamping ram 210 reciprocates and a closed channel 205 is formed within an inside wall of the clamping cylinder 200 to connect the holes 202 and 204. Therefore, oil is discharged from the clamping cylinder 200 through the hole 204 at one side of clamping cylinder 200 which the clamping ram 210 approaches when the clamping ram 210 moves within the clamping cylinder 200, and then introduced into the clamping cylinder 200 through the hole 202 at the other side. That is, when the clamping ram 210 performs reciprocation, oil in the clamping cylinder 200 forms a course that circulates within the clamping cylinder 200.

In the mold clamping apparatus having the closed channel 205, the clamping ram 210 can rapidly move within the clamping cylinder 200 because oil does not flow between the clamping cylinder 200 and the external oil tank when the clamping ram 210 reciprocates within the clamping cylinder 200.

However, it is necessary to limit the size of the channel 205 according to the size of the clamping cylinder 200, and the channel 205 of the limited size also restricts the quantity of oil flowing therethrough, so that the clamping ram 210 cannot reciprocate at high speed.

Further, the clamping cylinder 200 has a large volume because the channel 205 is formed within the inside wall of the clamping cylinder 200, and it is difficult to fabricate the clamping cylinder 200 since the clamping cylinder 200 has an asymmetric shape to form the channels 205. Moreover, it is also difficult to form the channel 205 in the clamping cylinder 200 that has the machined inside.

FIG. 4 is a side sectional view of a conventional mold clamping apparatus having a clamping cylinder of stepped inside diameter sections. As shown in FIG. 4, the conventional mold clamping apparatus is characterized in that a large diameter section 302 of a first length K1 and a small diameter section 306 of a second length K2 are discriminatively formed inside a clamping cylinder 300 where a clamping ram 310 reciprocates. In an piston head 312 of the clamping ram 310, an O-ring 314 is installed to shut the small diameter section 306 of the clamping cylinder 300 from the large diameter section 302 of the clamping cylinder 300. The inside diameter of the large diameter section 302 is formed larger than that of the small diameter section 306, and the inside diameter of the small diameter section 306 is substantially same as the outer diameter of a piston head 312 of the clamping ram 310.

When the clamping ram 310 moves from the large diameter section 302 to the small diameter section 306 within the clamping cylinder 300, oil flows from the small diameter section 306 beyond the piston head 312 in a direction reverse to the motion of the clamping ram 310.

However, the O-ring 314 installed in the piston head 312 of the clamping ram 310 and made of for example rubber is expanded in the large diameter section 302 of the clamping cylinder 300 but is compressed in the small diameter section 306 owing to the movement of the clamping ram 310. Also, there is a step 307 between the large diameter section 302 and the small diameter section 306 of the clamping cylinder 300. Therefore, as the clamping ram 310 repeatedly reciprocates between the large diameter section 302 and the small diameter section 306, the O-ring 314 collides against the step 307 at the side of the small diameter section 306, potentially tearing itself.

When the piston head 312 of the clamping ram 310 which moves with high speed is located in the large diameter section 302, the piston head 312 does not contact the inner surface of the large diameter section 302. Thus, radial vibration may take place in the clamping ram 310 when the clamping ram 310 reciprocates at high speed. If a guide 320 supporting a front portion of the clamping ram 310 is extended longitudinally to prevent the vibration, the stroke length of the moving platen is reduced, which causes difficulty in the fabrication of products with a thick mold.

Further, the piston head 312 of the clamping ram 310 is necessarily located within the small diameter section 306 when clamping force is applied. However, since it is impossible to apply the clamping force when the piston head 312 of the clamping ramp 310 is located in the large diameter section 302 owing to the thickness of the mold, it is required to increase the length of the clamping cylinder 300 in order to fabricate thick products.

SUMMARY OF THE INVENTION

The present invention has been made to solve the foregoing problems and it is therefore an object of the present invention to provide a high speed direct mold clamping apparatus of an injection molding machine which has a grooved oil channel inside a clamping cylinder to minimize the flow of oil between an inner space of the clamping cylinder and an external oil tank so that the clamping ram can perform high speed reciprocation within the clamping cylinder.

According to an aspect of the invention for realizing the above objects, there is provided a high speed direct mold clamping apparatus of an injection molding machine including: a clamping cylinder of a uniform inside diameter, the clamping cylinder including an oil channel portion having at least one grooved oil channel formed therein and a close contact portion formed of a curved surface leaded to the oil channel portion; a clamping ram slidably coupled with the clamping cylinder, and having a first channel for allowing for the flow of oil and a booster cylinder connected to the first channel; a booster ram slidably coupled with the booster cylinder of the clamping ram and having a second channel leaded to the booster cylinder; a moving platen coupled with one end of the clamping ram; a stationary platen installed to be opposed to the moving platen; a first port formed in the oil channel portion for the selective flow of oil; a second port formed in the close contact portion for the selective flow of oil.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to a high speed direct mold clamping apparatus according to a preferred embodiment of the present invention, examples of which are illustrated in the accompanying drawings.

Figure 1:
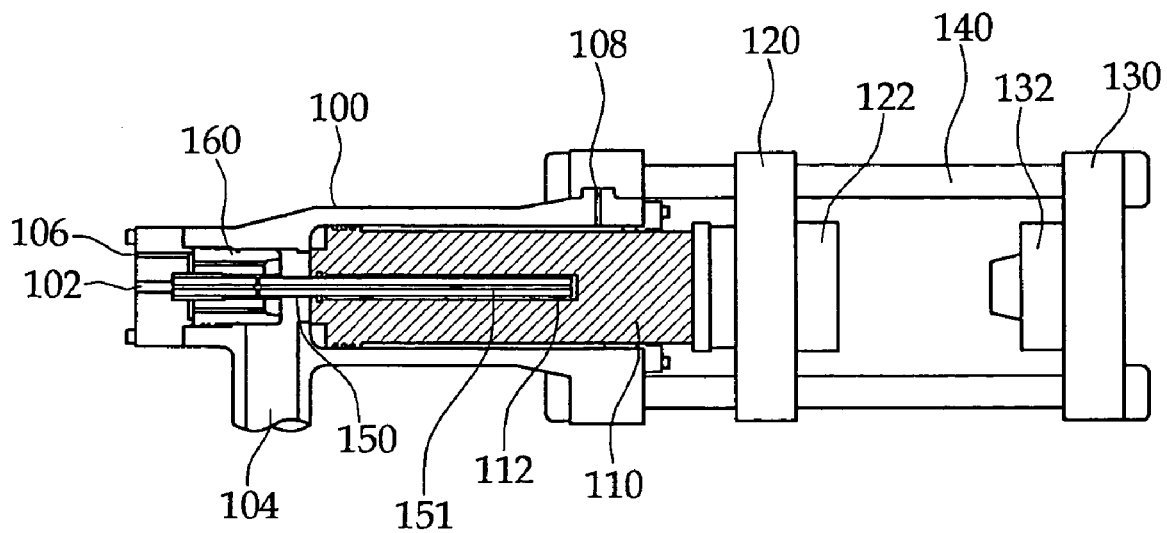
FIG. 1 is a side sectional view illustrating a conventional direct mold clamping apparatus of an injection molding machine.
Figure 2A:
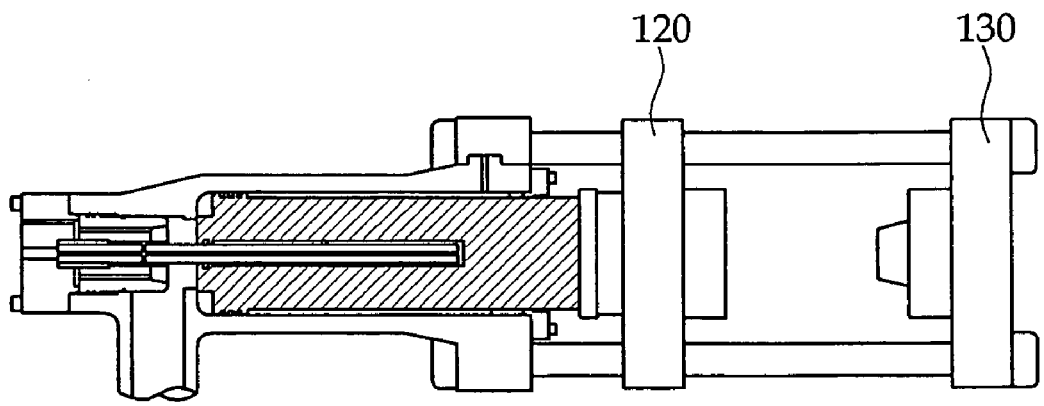
FIG. 2A is a side sectional view illustrating the mold clamping apparatus shown in FIG. 1 in which the mold is opened.
Figure 2B:
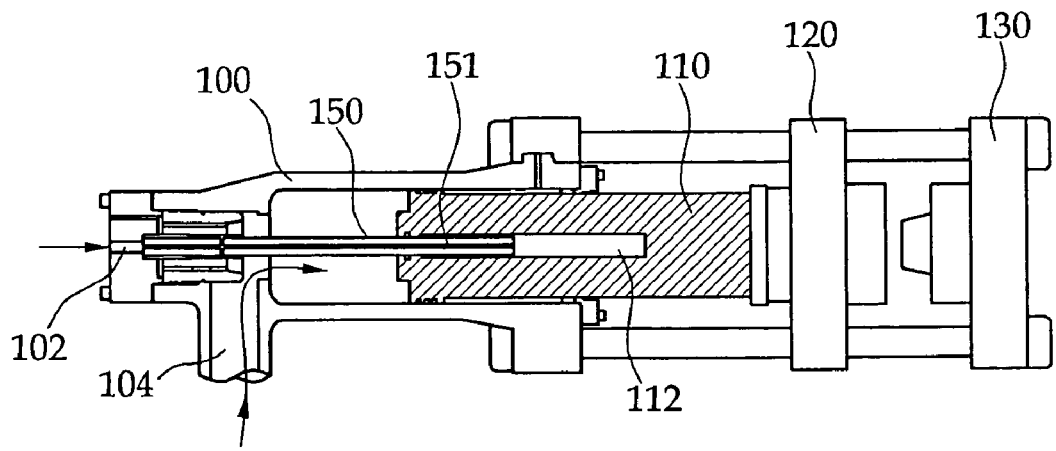
FIG. 2B is a side sectional view illustrating the mold clamping apparatus shown in FIG. 1 in which the moving platen is advancing forward.
Figure 2C:
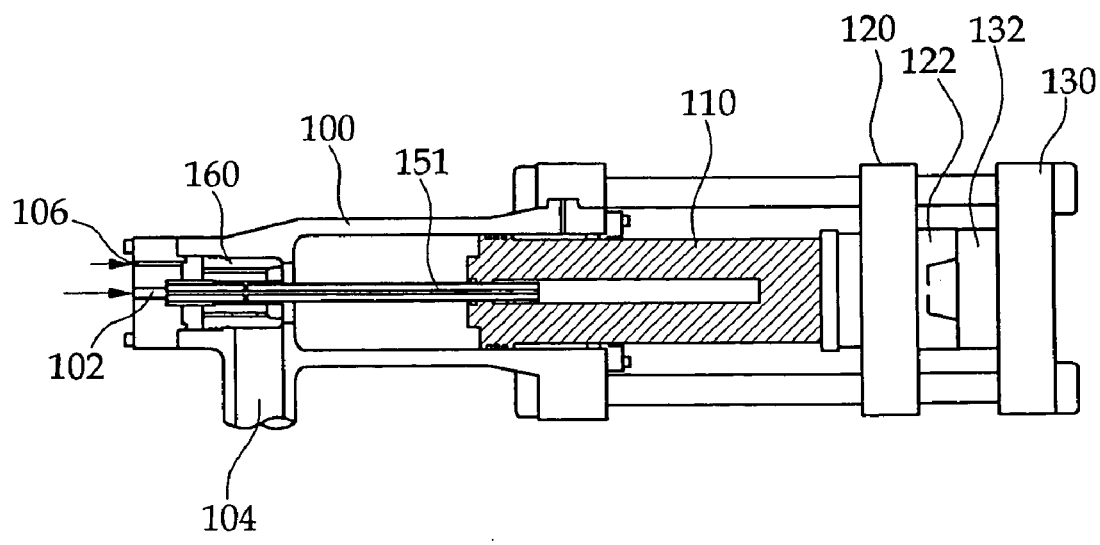
FIG. 2C is a side sectional view illustrating the mold clamping apparatus shown in FIG. 1 in which the mold is closed.
Figure 2D:
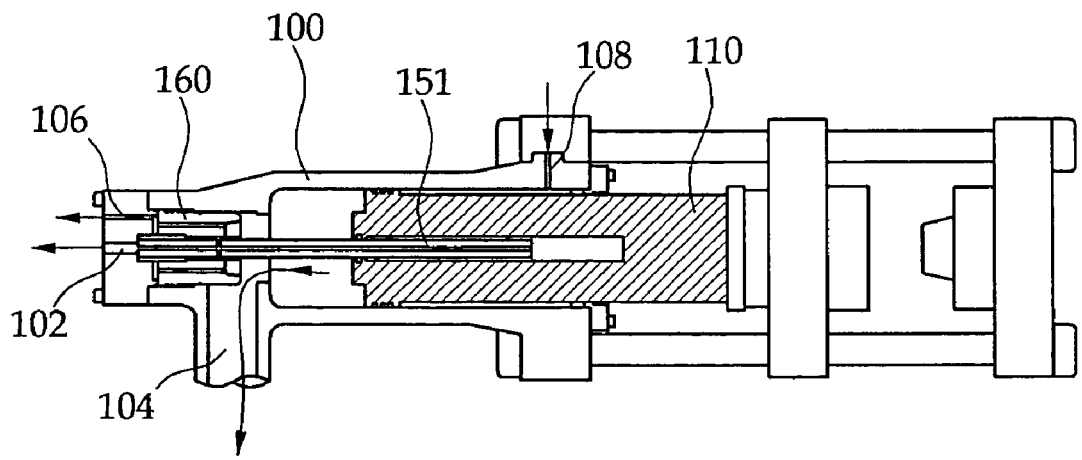
FIG. 2D is a side sectional view illustrating the mold clamping apparatus shown in FIG. 1 in which the moving platen is returning.
Figure 3:
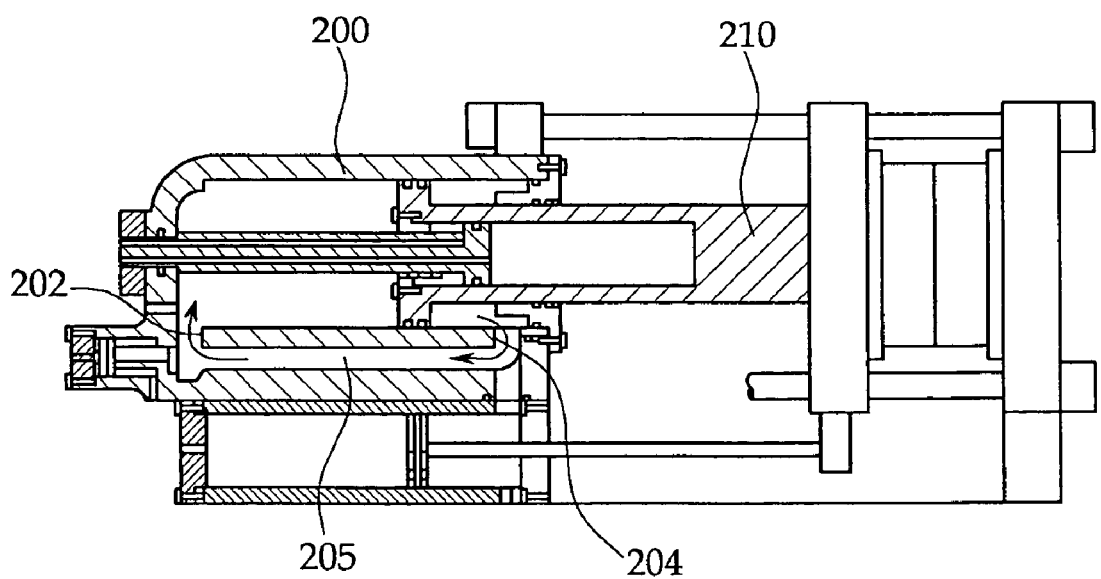
FIG. 3 is a side sectional view illustrating a conventional mold clamping apparatus with a closed channel.
Figure 4:
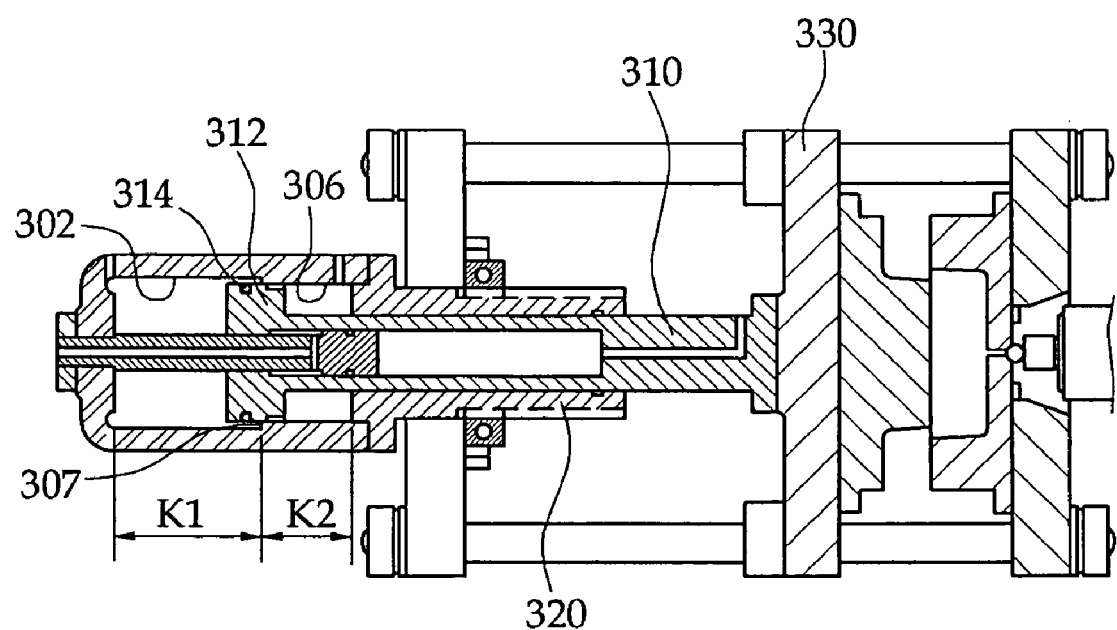
FIG. 4 is a side sectional view of a conventional mold clamping apparatus having a clamping cylinder of stepped inside diameter sections.
Figure 5:
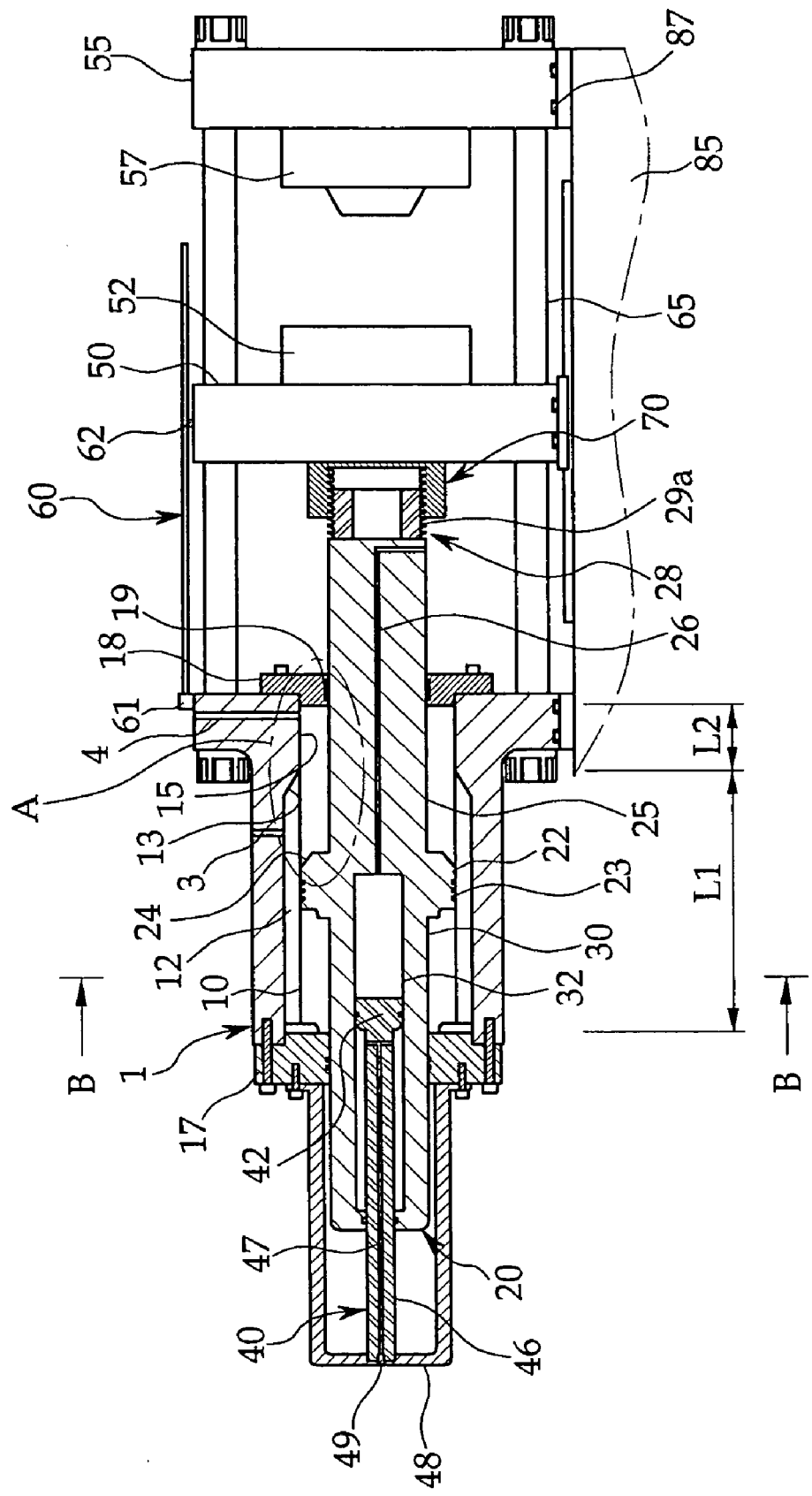
FIG. 5 is a side sectional view of a high speed direct mold clamping apparatus of an injection molding machine according to the invention.
Figure 6:
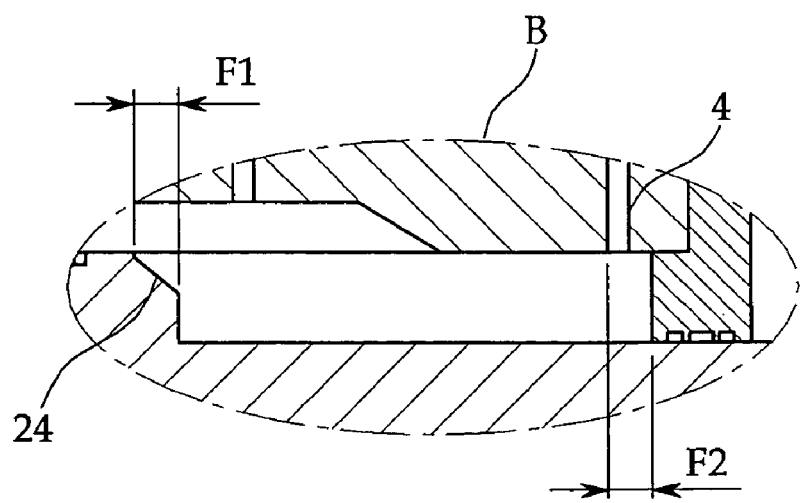
FIG. 6 is an enlargement of a part A in FIG. 5.
Figure 7:
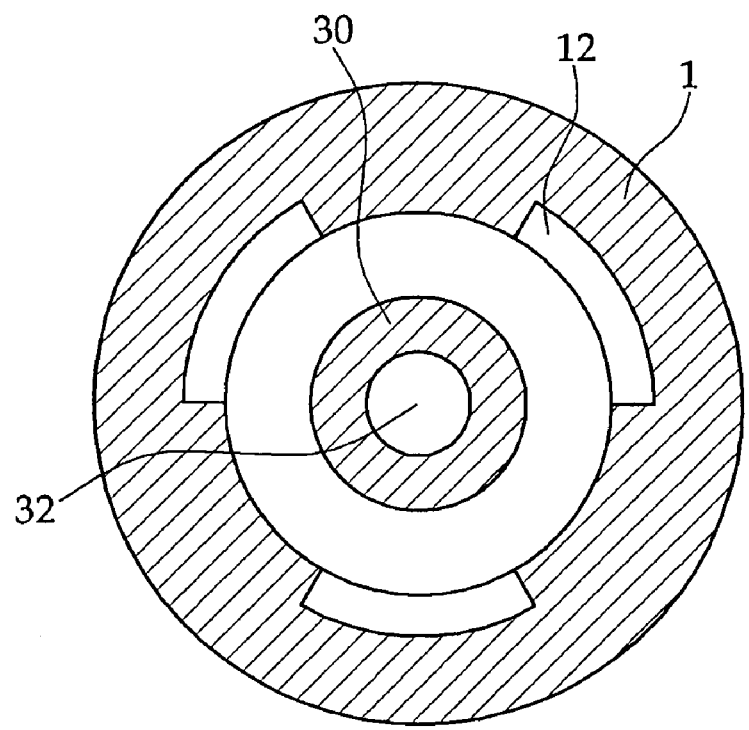
FIG. 7 is a sectional view taken along a line B—B in FIG. 5.

FIG. 5 is a side sectional view of a high speed direct mold clamping apparatus of an injection molding machine according to the invention, FIG. 6 is an enlargement of a part A in FIG. 5, and FIG. 7 is a sectional view taken along a line B—B in FIG. 5.

As shown in FIGS. 5 to 7, a high speed direct mold clamping apparatus of the invention includes a clamping cylinder, a clamping ram 20 reciprocatingly coupled with the clamping cylinder 1, a booster ram 40 coupled with a booster cylinder 32 formed within the clamping ram 20 to reciprocate within the clamping cylinder 1, a stationary section 48 coupled with one end of the booster ram 40 and fixed to one portion of the clamping cylinder 1, a moving platen 50 fixed to one end of the clamping ram 20, a position sensor 60 for detecting the position of the moving platen 50, a plurality of tie bars 65 fixed to the clamping cylinder 1 to guide the movement of the moving platen 50 and a stationary platen 55 fixed to one ends of the tie bars 65 and opposed to the moving platen 50.

The moving platen 50 is attached with a moving mold 52, and the stationary platen 55 is attached with a stationary mold 57.

The clamping ram 20 includes a central ram portion 22 which tightly contacts the inside wall of the clamping cylinder 1 and slidably couples with the clamping cylinder 1, a front ram portion 25 extended forward from the central ram portion 22 with desired values of diameter and length and a rear ram portion 30 extended backward from the central ram portion with desired values of diameter and length. The clamping ram 20 is provided at the front ram portion 25 with a first channel 26 for connecting the booster cylinder 32 with an external oil tank (not shown) and at an end of the front ram portion 25 with coupling projections 29a for coupling with the moving platen 50. An O-ring 23 is provided on the central ram portion 22 to seal oil, and the central ram portion 22 is reduced with diameter at a front end thereof to form a tapered portion 24 of a suitable width F1. The booster cylinder 32 is provided in the rear ram portion 30 of the clamping ram 20 and has desired values of diameter and length in a longitudinal direction.

The clamping cylinder 1 is provided therein with an oil channel portion 10 having a plurality of grooved oil channels 12 of a desired depth and a close contact portion 15 formed of a single curved surface which contacts the oil channel portion 10 and closely contacts the entire outer surface of the central ram portion 22. The oil channel portion 10 has a desired length L1, and the close contact portion 15 has a desired length L2. The oil channel portion 10 and the close contact portion 15 have the same inside diameter except for the grooved oil channels 12. At least one of the grooved oil channels 12 is provided with a first port 3 connected with the external oil tank, and the close contact portion 15 of the clamping cylinder 1 is provided with a second port 4 connected with the external oil tank. The distance F2 between the second port 4 and the front end of the close contact portion 15 is smaller than the width F1 of the tapered portion 24 of the central ram portion 22 of the clamping ram 20.

The grooved oil channels 12 are extended to the length L1 along the longitudinal direction of the clamping cylinder 1 with an arc-shaped section of the same depth in a radial direction. One ends of the grooved oil channels 12 are gradually reduced with depth to form a transition portion 13 connected with the close contact portion 15.

At the rear end of the clamping cylinder 1, there is a rear closing portion 17 for closing the inside of the clamping cylinder 1. At the front end of the clamping cylinder 1, there is a discal front sealing portion 18 which seals the inside of the clamping cylinder 1, and has a through-hole portion 19 for allowing the penetration of the front ram portion 25.

The booster ram 40 has a booster ram head 42, which tightly contacts and slidably couples with the inside wall of the booster cylinder 32 of the clamping ram 20, and a booster ram shaft 46 extended from the booster ram head 42 and fixed to the stationary section 48.

The booster ram shaft 46 is provided therein with a second channel 47 connected with an inlet 49 in the stationary section 48 and perforated to the outside of the booster ram shaft 46 adjacent to the booster ram head 42. The second channel 47 connects the booster cylinder 32 with the external oil tank (not shown).

The position sensor 60 includes a position dog device 62 attached to the moving platen 50 and a position detector 61 for communicating the position dog device 62 and detecting the real time position of the moving platen 50. The position sensor 60 may be realized based upon the electromagnetic principle using magnets or the Ohm's Law of resistors.

The moving platen 50 is coupled with the clamping ram 20 via fastening elements 70 and 75 which can adjust the coupling distance from the moving platen 50 to one end of the clamping ram 20. Examples of the fastening elements may include a half nut unit 70 or a rotary fastening unit 75 which will be described later.

Figure 8:
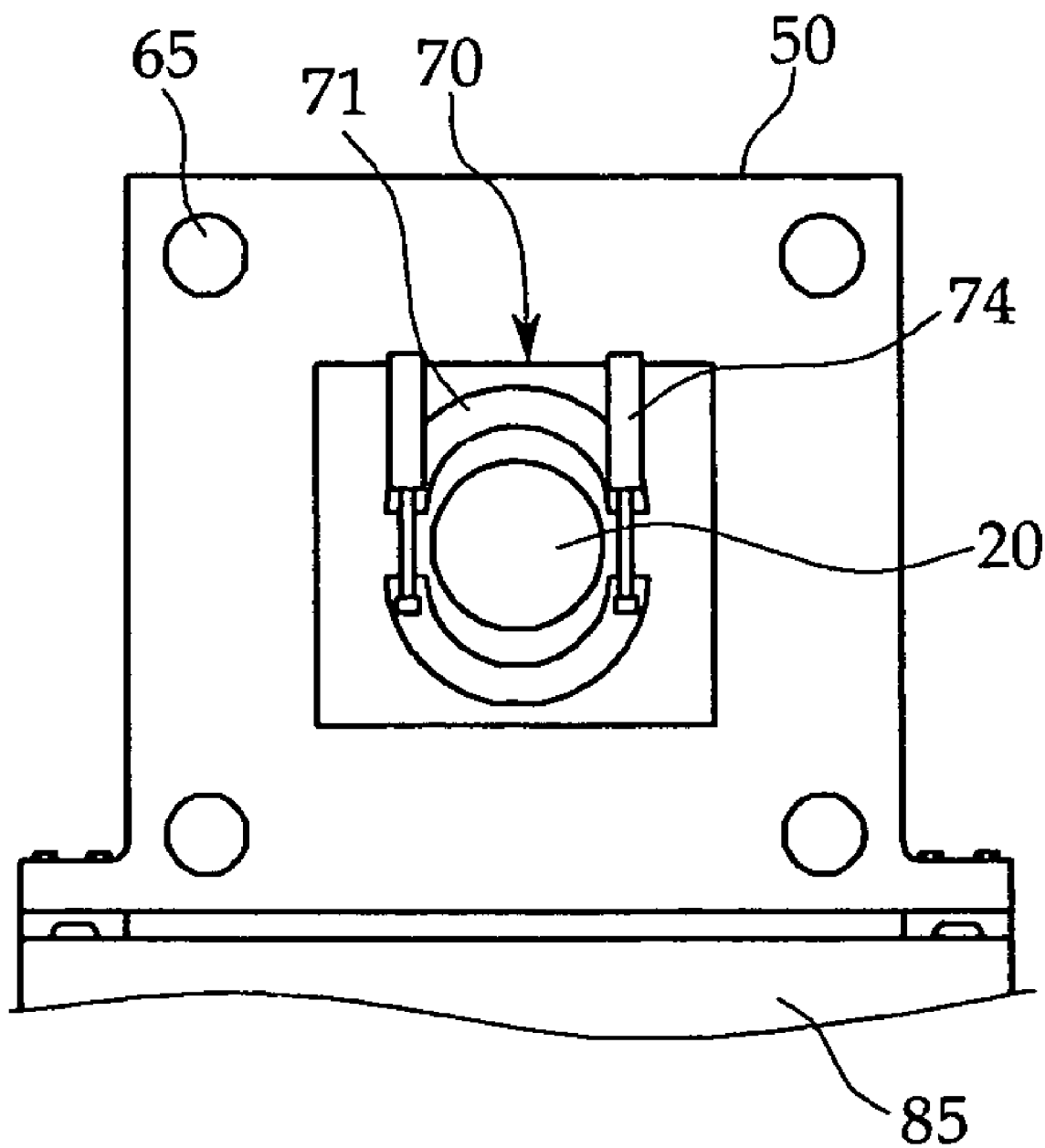
FIG. 8 is a front elevation view schematically illustrating the half nut unit of the high speed direct mold clamping apparatus of an injection molding machine according to the invention.
Figure 9:
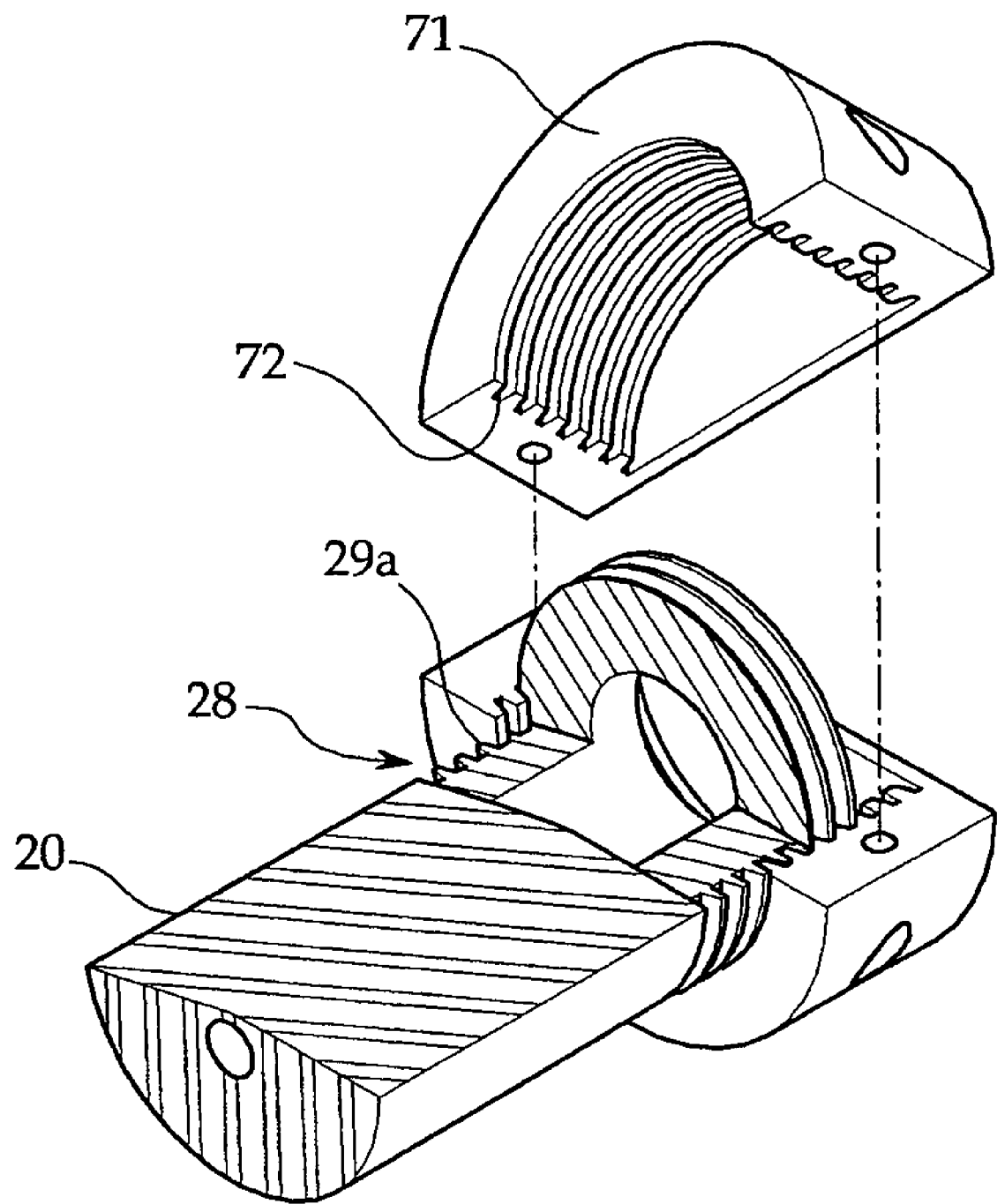
FIG. 9 is a partially broken perspective view of the clamping ram which is coupled with the half nut unit.

FIG. 8 is a front elevation view schematically illustrating the half nut unit of the high speed direct mold clamping apparatus of an injection molding machine according to the invention, and FIG. 9 is a partially broken perspective view of the clamping ram which is coupled with the half nut unit. As shown in FIGS. 8 and 9, the half nut unit 70 includes a pair of half nuts 71 each having a plurality of semicircular coupling grooves 72 and hydraulic cylinders 74 capable of actuating to tightly close the pair of half nuts 71 together so that the half nuts 71 engage with an end 28 of the clamping ram 20 having the coupling projections 29a.

Figure 10:
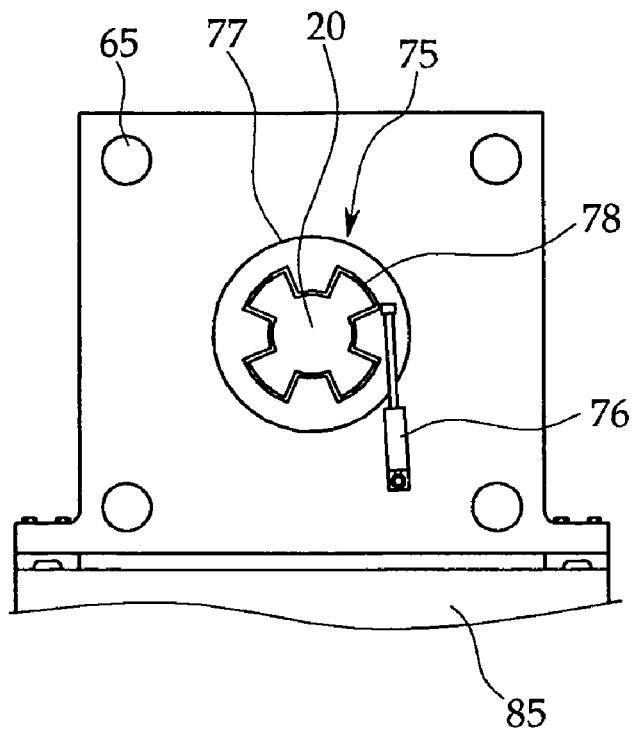
FIG. 10 is a front elevation view schematically illustrating the rotary fastening unit of the high speed direct mold clamping apparatus of an injection molding machine according to the invention.
Figure 11:
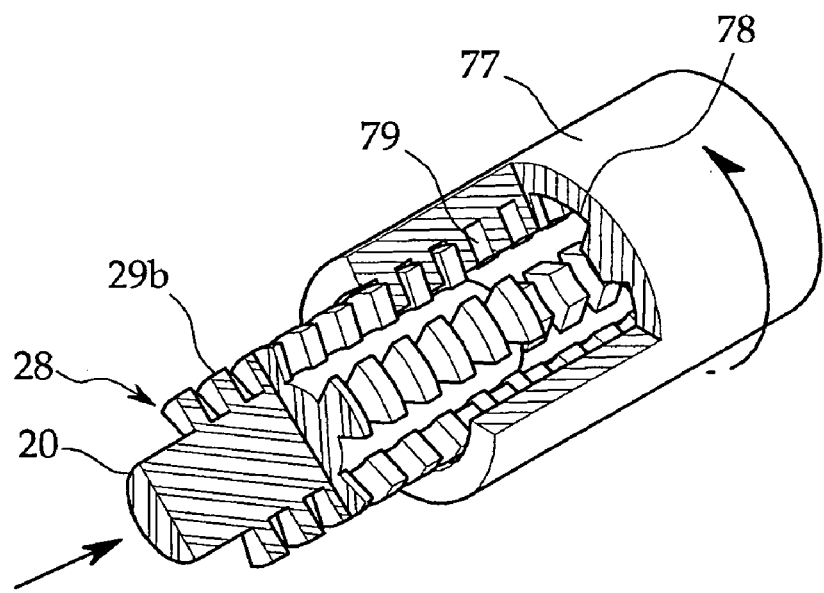
FIG. 11 is a partially broken perspective view of the clamping ram which is coupled with the rotary fastening unit.

FIG. 10 is a front elevation view schematically illustrating the rotary fastening unit of the high speed direct mold clamping apparatus of an injection molding machine according to the invention, and FIG. 11 is a partially broken perspective view of the clamping ram which is coupled with the rotary fastening unit. As shown in FIGS. 10 and 11, the clamping ram may be provided at the end 28 with crossed coupling projections 29b. The rotary fastening unit 75 includes a rotatable section 77, which is rotatably installed in the moving platen 50, and hydraulic cylinders 76 for rotating the rotatable section 77 to a predetermined angle. The rotatable section 77 has a crossed through hole 78 for allowing the insertion of the end 28 of the clamping ram 29 with the crossed coupling projections 29b and coupling grooves 79 formed radially around the through hole 78. The rotatable section 77 is provided rotatable with respect to the moving platen 50 by using a bearing (not shown) as well known to those skilled in the art.

While closing elements such as packings, sealing rings or O-rings 23 are to be inserted between the afore-described parts to prevent any leak of oil filled in spaces defined by those parts, the sealing elements will not be described in detail herein since they may be easily perceived by those skilled in the art.

Control means are connected with the position senor 60 to control the selective flow of oil between the first and second channels 26 and 47 and the first and second ports 3 and 4. The control means may utilize a control unit having a CPU, but it will not be described in detail herein since it may be easily perceived by those skilled in the art.

The high speed direct mold clamping apparatus is fixed to a stationary base frame 85 via fixing means such as bolts 87, and the moving platen 50 is guided by the tie bars and movably installed by a sliding guide or a sliding surface in the frame 85.

Hereinafter the operation of the high speed direct mold clamping apparatus of an injection molding machine according to the preferred embodiment of the invention will be described.

Figure 12A:
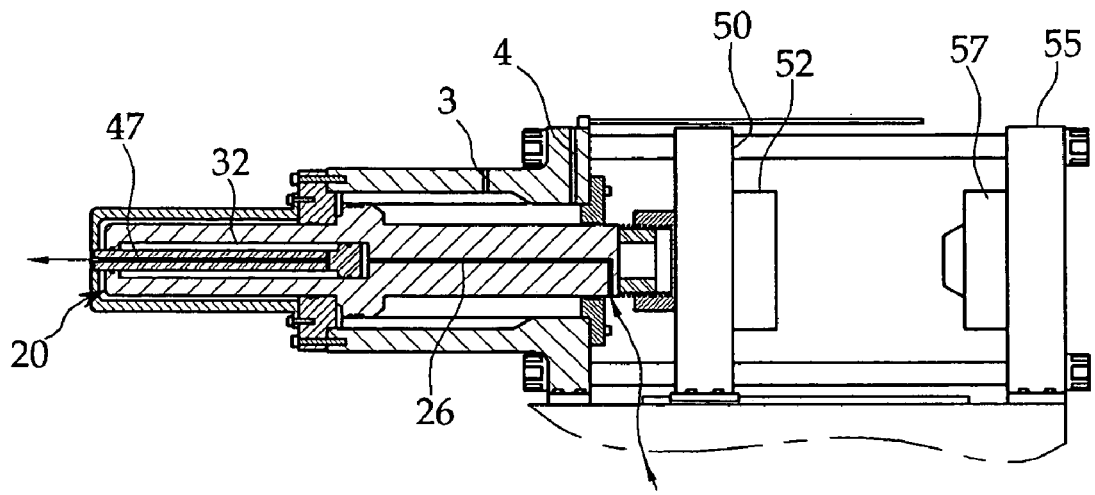
FIG. 12A is a side elevation view illustrating the high speed direct mold clamping apparatus of an injection molding machine according to the invention in the initial position.
Figure 12B:
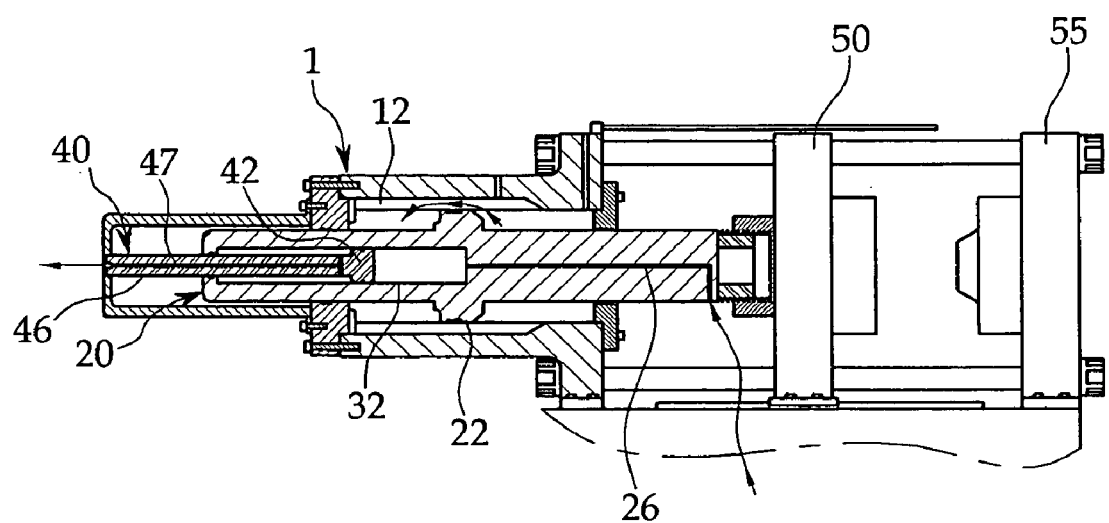
FIG. 12B is a side elevation view illustrating the high speed direct mold clamping apparatus of an injection molding machine according to the invention in the advancing position of the clamping ram.
Figure 12C:
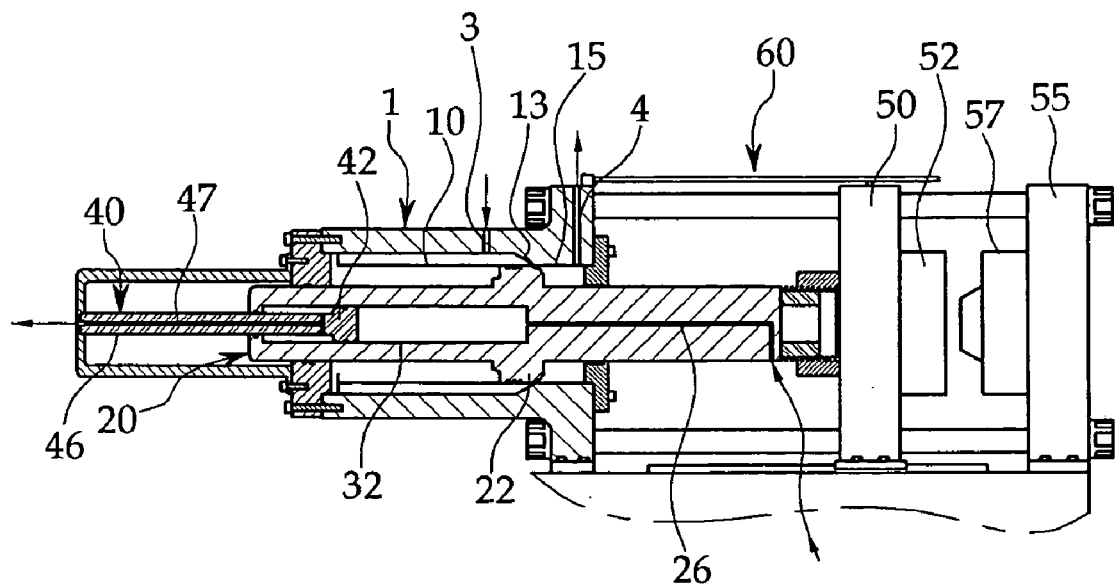
FIG. 12C is a side elevation view illustrating the high speed direct mold clamping apparatus of an injection molding machine according to the invention in the position of the clamping ram entering the close contact portion.
Figure 12D:
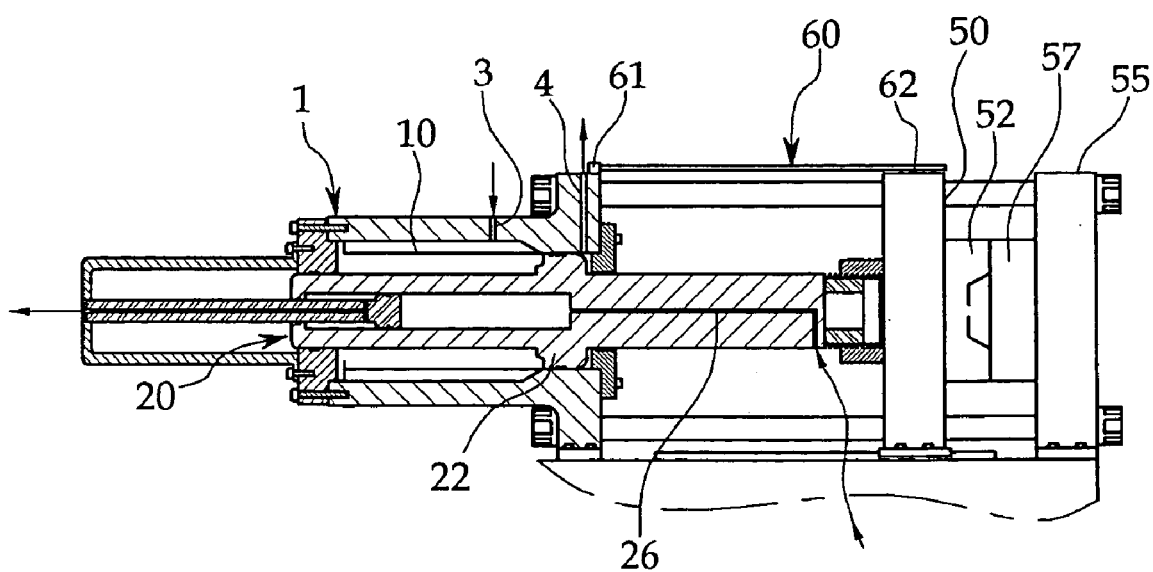
FIG. 12D is a side elevation view illustrating the high speed direct mold clamping apparatus of an injection molding machine according to the invention in the closed position of the mold.
Figure 12E:
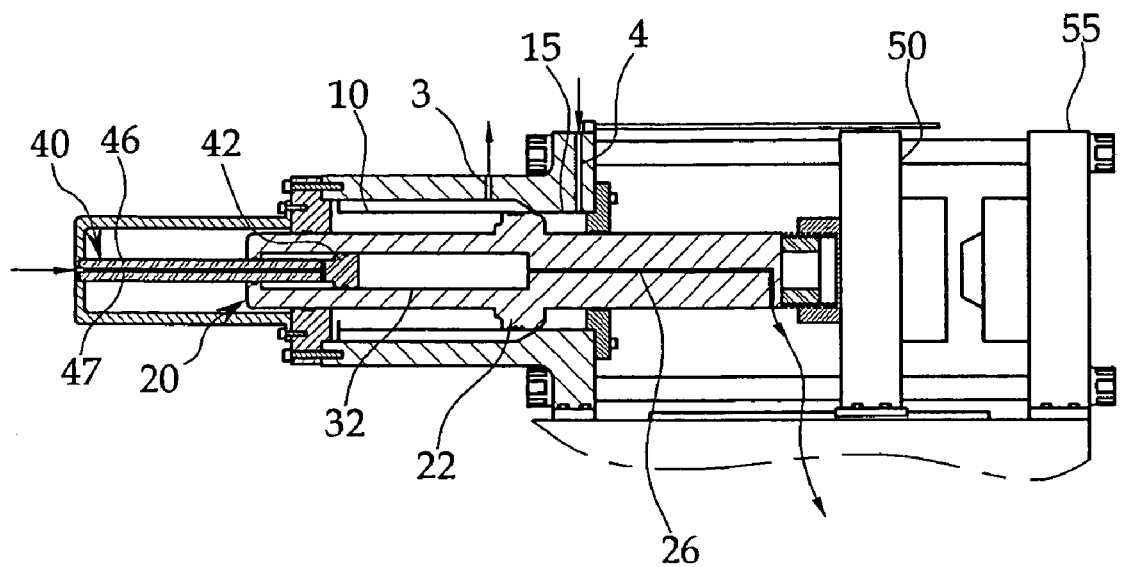
FIG. 12E is a side elevation view illustrating the high speed direct mold clamping apparatus of an injection molding machine according to the invention in the position of the clamping ram retreating from the close contact portion.
Figure 12F:
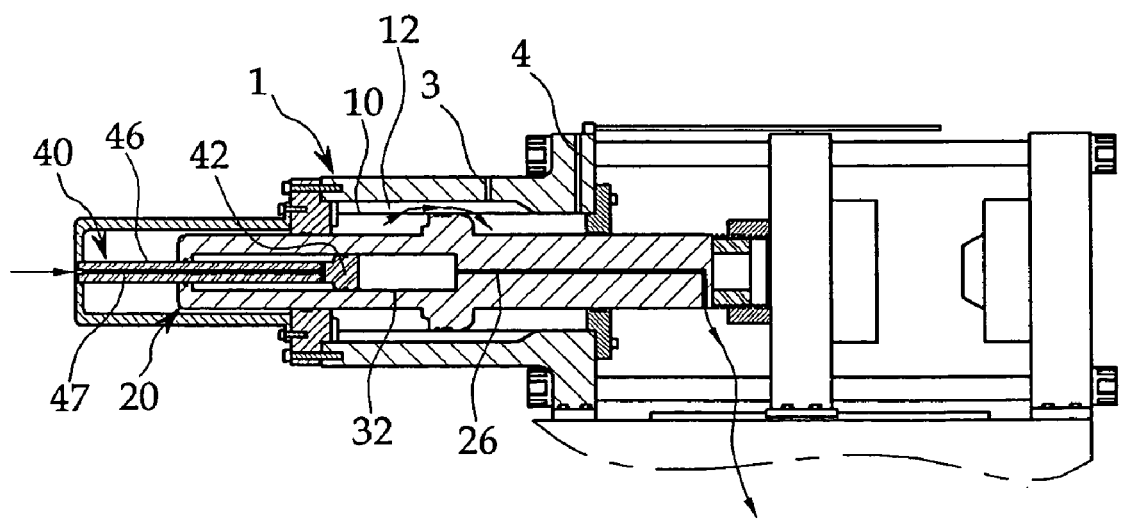
FIG. 12F is a side elevation view illustrating the high speed direct mold clamping apparatus of an injection molding machine according to the invention in the position of the clamping ram retreating from the oil channel portion.

FIG. 12A is a side elevation view illustrating the high speed direct mold clamping apparatus of an injection molding machine according to the invention in the initial position, FIG. 12B is a side elevation view illustrating the high speed direct mold clamping apparatus of an injection molding machine according to the invention in the advancing position of the clamping ram, FIG. 12C is a side elevation view illustrating the high speed direct mold clamping apparatus of an injection molding machine according to the invention in the position of the clamping ram entering the close contact portion, FIG. 12D is a side elevation view illustrating the high speed direct mold clamping apparatus of an injection molding machine according to the invention in the closed position of the mold, FIG. 12E is a side elevation view illustrating the high speed direct mold clamping apparatus of an injection molding machine according to the invention in the position of the clamping ram retreating from the close contact portion, and FIG. 12F is a side elevation view illustrating the high speed direct mold clamping apparatus of an injection molding machine according to the invention in the position of the clamping ram retreating from the oil channel portion.

As shown in FIG. 12A, in the initial position of the mold clamping apparatus, the distance between the moving platen 50 and the stationary platen 55 is maintained by the maximum value, the first and second channels 26 and 47 are opened, and the first and second ports 3 and 4 are closed.

When high pressure oil is flown into the booster cylinder 32 through the first channel 26 from the external oil tank, oil filled in the booster cylinder 32 forms high pressure so that the clamping ram 20 attached with the moving platen 50 moves within the clamping cylinder 1. As shown in FIG. 12B, high pressure oil pushes the clamping ram 20 forward. At the same time, oil filled in the booster cylinder 32 at the rear of the booster ram head 42 is discharged through the second channel 47 of the booster ram 40 to the external oil tank. Further, oil flows from the front of the central ram portion 22 of the clamping cylinder 1 through the grooved oil channels 12 to the rear of the central ram portion 22.

In the forward movement of the clamping ram 20 pushing the moving platen 50 toward the stationary platen 55, when the central ram portion 22 of the clamping ram 20 arrives at the close contact portion 15 through the transition portion 13 of the grooved oil channels 12 as shown in FIG. 12C, the close contact portion 15 and the oil channel portion 10 are shut from each other by the central ram portion 22. Then, oil in the front of the central ram portion 22 does not flow to the rear of the central ram portion 22 any more. It is required that oil is discharged from the close contact portion 15 to the outside and oil is introduced into the oil channel portion 10 from the outside so that the clamping ram 20 can advance further. Oil is introduced into the oil channel portion 10 through the first port 3 and oil in the close contact portion 15 is discharged to the outside through the second port 4.

During the movement of the clamping ram 20, the position sensor 60 detects the real time position of the moving mold 52, which moves along with the tie bars 65, and transfers the position information of the moving mold 52 attached to the moving platen 50 related to the coupling with the stationary mold 57 to the control means.

As shown in FIG. 12D, when the moving platen 50 arrives a predetermined position so that the moving mold 52 attached to the moving platen 50 is fastened with the stationary mold 57 attached to the stationary platen 55, high pressure oil is introduced into the oil channel portion 10 of the clamping cylinder 1 via the first port 3. Then, clamping force is applied to the molds 55 and 57 so that the injection molding machine injects molten resin to form a product.

After the product is manufactured through the above process, high pressure oil is introduced into the second channel 47 of the booster ram 40 from the outside as shown in FIG. 12E. High pressure oil flows through the second channel 47 into the booster cylinder 32 forming high pressure therein. Then, the clamping ram 20 retreats and returns to the initial position. At the same time, oil in the front of the booster cylinder 32 is discharged through the first channel 26 to the outside. Until the central ram portion 22 of the clamping ram 20 arrives the oil channel portion 10, oil is introduced into the close contact portion 15 of the clamping cylinder 1 through the second port 4, and oil is simultaneously discharged from the oil channel portion 10 through the first port 3 to the outside.

As oil is continuously introduced into the booster cylinder 32 through the second channel 47 and oil is discharged from the booster cylinder 32 through the first channel 26 to the outside, the clamping ram 20 keeps retreating. Then, as shown in FIG. 12F, the central ram portion 22 of the clamping ram 20 enters the oil channel portion 10 and at the same time the first and second ports 3 and 4 are closed. As the clamping ram 20 keeps retreating, oil in the rear of the central ram portion 22 flows into the front of the central ram portion 22 through the grooved oil channels 12. Through repeating this process, the clamping ram 20 returns to the original or initial position as shown in FIG. 12A. Therefore, the clamping ram 20 completes one stroke in the order of FIGS. 12A to 12F and FIG. 12A.

In the above process, the same quantity of oil is introduced into the clamping cylinder 1 from the external oil tank and discharged from the clamping cylinder 1 to the external oil tank, and will be expressed as follows:

Oil inflow=(Area of the close contact portion−Sectional area of the front ram portion)×L2

The quantity of oil inflow is relatively less than that introduced by a conventional direct mold clamping apparatus or a mold clamping apparatus having a clamping cylinder of stepped inside diameter sections.

Therefore, the high speed direct mold clamping apparatus of the invention relatively reduces the quantity of oil inflow or discharge by large levels so that the clamping ram 20 coupled with the moving platen 50 can perform high speed movement.

According to the high speed direct mold clamping apparatus of the invention as set forth above, oil flows from the clamping cylinder 1 through the grooved oil channels 12 into the clamping cylinder 1 to minimize the quantity of oil flowing between the clamping cylinder 1 and the external oil tank so that the clamping ram 20 can move at a high speed within the clamping cylinder 1.

If the thickness of the mold is changed according to molded products, the fastening elements 70 and 75 fasten the moving platen 50 with the clamping ram 20 by adjusting the length therebetween.

Figure 13:
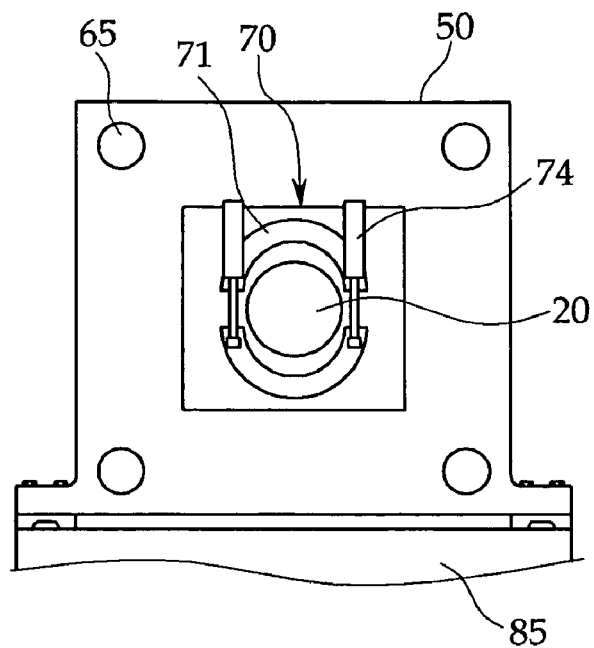
FIG. 13 is a front elevation view illustrating the half nut unit shown in FIG. 8 in the position prior to fastening.
Figure 14:
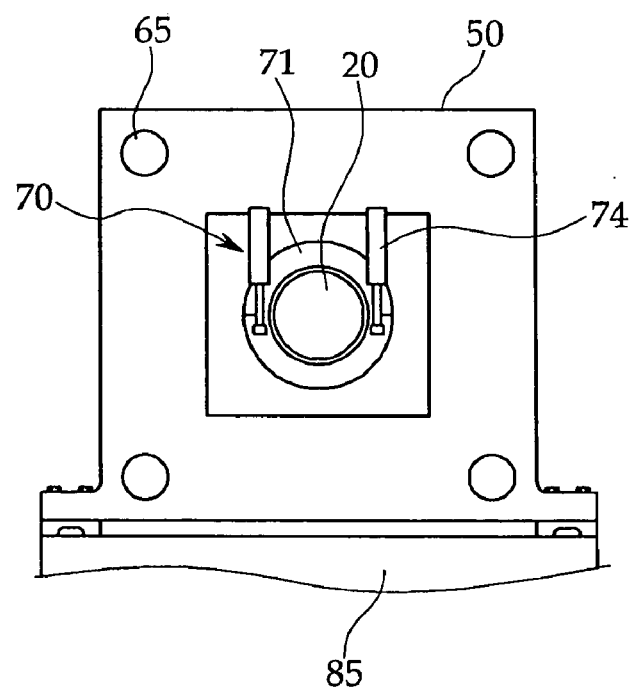
FIG. 14 is a front elevation view illustrating the half nut unit shown in FIG. 8 in the fastened position.

FIG. 13 is a front elevation view illustrating the half nut unit shown in FIG. 8 in the position prior to fastening, and FIG. 14 is a front elevation view illustrating the half nut unit shown in FIG. 8 in the fastened position. As shown in FIGS. 13 and 14, the distance between the moving platen 50 and the clamping ram 20 can be changed with the half nut unit 70 by actuating the hydraulic cylinders 74 to detach the pair of half nuts 71, feeding oil into the booster cylinders 32 to change the position of the end 28 of the front ram portion 25 of the clamping ram 20, and then, assembling the half nuts 71 again.

Figure 15:
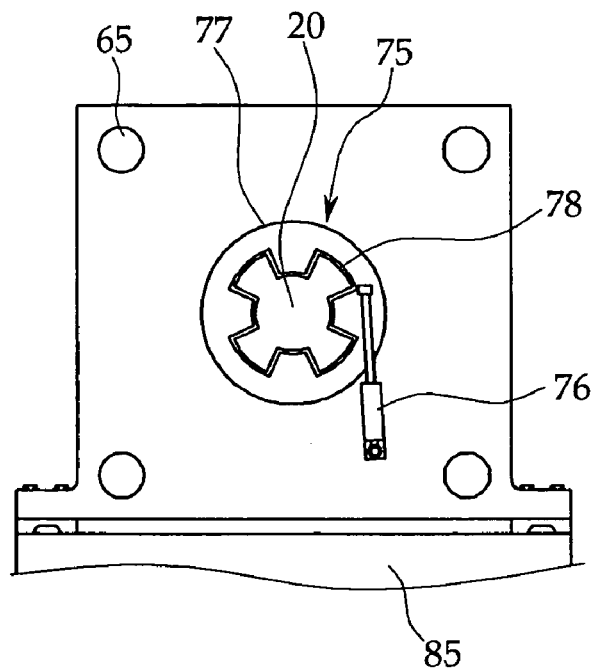
FIG. 15 is a front elevation view illustrating the rotary fastening unit shown in FIG. 10 in the position prior to fastening.
Figure 16:
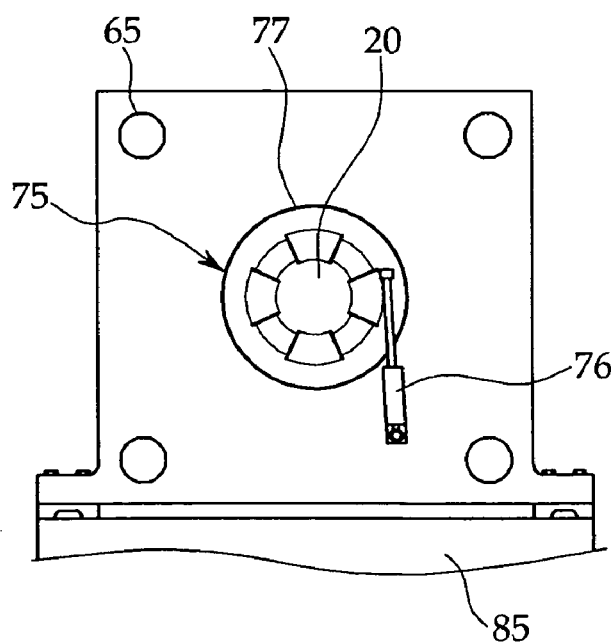
FIG. 16 is a front elevation view illustrating the rotary fastening unit shown in FIG. 10 in the fastened position.

FIG. 15 is a front elevation view illustrating the rotary fastening unit shown in FIG. 10 in the position prior to fastening, and FIG. 16 is a front elevation view illustrating the rotary fastening unit shown in FIG. 10 in the fastened position. As shown in FIGS. 15 and 16, the distance between the moving platen 50 and the clamping ram 20 can be changed with the rotary fastening unit 70 by rotating the rotatable section 77 with the hydraulic cylinders 76 to align grooves of the crossed through hole 78 with the crossed coupling projections 29b at the end of the front ram portion 25, adjusting the position of the end 28 of the front ram portion 25, and actuating the hydraulic cylinders 76 again to turn the rotatable portion 77 to a desired angle so that the rotatable portion 77 is fastened with the end 28 of the front ram portion 25 in a new position.

If the mold installed in the moving platen 50 and the stationary platen 55 are thick, the fastening elements 70 and 75 can be adjusted to reduce the distance between the end 28 of the clamping ram 20 and the moving platen 50. As a result, although the close contact portion 15 of the clamping cylinder 1 is made short, products can be manufactured with a thick mold. If the mold is provided relatively thin, the distance from the end of the clamping ram 20 to the moving platen 50 is increased on the contrary.

The clamping cylinder 1 of the high speed direct mold clamping apparatus of the invention has a uniform inside diameter so that those regions of the oil channel portion 10 alternating with the grooved oil channels 12 are smoothly leaded to the inside surface of the close contact portion 15. This can maintain the O-ring 23 of the central ram portion 22 of the clamping ram 20 in a compressed position. As a result, when the clamping ram 20 reciprocates within the clamping cylinder 1, the O-ring 23 of the central ram portion 22 can smoothly slide along the inside of the clamping cylinder 1 to prevent the tearing of the O-ring 23.

The grooved oil channels 12 of the clamping cylinder 1 are radially arranged across the inside wall of the clamping cylinder 1 so that those regions of the oil channel portion 10 alternating with the grooved oil channels 12 uniformly support the O-ring 23 in the central ram portion 22. This as a result uniformly presses and maintains the O-ring 23 in a symmetric configuration so that the O-ring 23 smoothly slides within the clamping cylinder 1 to more effectively prevent the tearing of the O-ring 23. If the grooved oil channels 12 are formed at a uniform interval, the O-ring 23 more easily maintains the symmetric configuration.

Since one terminations of the grooved oil channels 12 are gradually reduced with depth to form the transition portion 13, there is no step which damages the O-ring 23 of the central ram portion 22 when the central ram portion 22 enters the close contact portion 15 of the clamping cylinder 1. Therefore, O-ring 23 is protected more effectively from tearing.

Further, in the mold clamping apparatus of the invention, the front ram portion 25 and the rear ram portion 30 of the clamping ram 20 are designed to have the same diameter so that when the central ram portion 22 of the clamping ram 20 moves along the oil channel portion 10, the volume within the clamping cylinder 1 is uniformly maintained. As a result, the clamping ram 20 can move at a high speed because oil is not introduced from or discharged into the outside.

In the mold clamping apparatus of the invention, the clamping cylinder 1 has the uniform inside diameter so that the central ram portion 22 of the clamping ram 20 maintains close contact with the inside wall of the clamping cylinder 1. Then, the clamping ram 20 can perform high speed reciprocation maintaining a horizontal position without radial vibration. As a result, the front sealing portion 18 for sealing the clamping cylinder 1 in the front can be formed discal without any guide member for concentrically guiding the clamping ram 20. Without the guide member, the moving platen 50 can further approach the clamping cylinder 1 to increase the stroke distance of thereof. Then, the mold clamping apparatus can be reduced with size while using a thicker mold.

Since the grooved oil channels 12 are arc-shaped with radially uniform depth, oil can flow through channels 12 by large quantity even though the grooved oil channels 12 are formed shallow. The shallow oil channels can also reduce the size of the clamping cylinder 1.

The tapered portion 24 is formed at one side of the central ram portion 22 of the clamping ram 20 so that oil can efficiently pass through the central ram portion 22. When the central ram portion 22 enters the close contact portion 15 of the clamping cylinder 1, the tapered portion 24 of the central ram portion 22 and the transition portion 13 of the grooved oil channels 12 smoothen the flow of oil from the front of the central ram portion 22 to the rear so that the clamping ram 20 can move at a high speed. Without the tapered portion 24, the flow of oil is interfered because oil flows in a direction perpendicular to the movement of the clamping ram 20 when the central ram portion 22 enters the close contact portion 15. However, the mold clamping apparatus of the invention overcomes this interference problem.

Because the second port 4 is placed so that the distance F2 from the second port 4 to the end of the close contact portion 15 of the clamping cylinder 1 is smaller than the width F1 of the tapered portion 24 of the central ram portion 22, even though the central ram portion 22 moves to the end of the close contact portion 15, the second port 4 is not closed by the tapered portion 24 of the central ram portion. As a result, since the central ram portion 22 cam move to the end of the close contact portion 15, it is possible to increase the stroke length of the clamping ram 20 while maintaining the small size of the mold clamping cylinder 1.

Applying the clamping force imparts high pressure to the inside of the clamping cylinder 1. In the mold clamping apparatus of the invention, the booster ram 40 is coupled via the end of the rear ram portion 30 of the clamping ram 20 outside the clamping cylinder 1 in order to prevent the risk that high pressure oil for applying the clamping force is introduced through a gap between the booster ram 40 and the booster cylinder 32 in the rear ram portion 30 to cause malfunction to the clamping ram 20.

Because the booster cylinder 32 is formed in the rear ram portion 30 which is relatively adjacent to the booster ram 40 in the clamping ram 20, the booster ram 40 coupled with the booster cylinder 30 can be reduced with length.

While the grooved oil channels 12 according to the preferred embodiment of the invention have the rectangular arc-shaped cross section, the invention is not limited thereto, but triangular or semicircular cross section should be considered to be within the scope of the invention.

Although the preferred embodiment of the invention has the stationary section 48 fixed to the clamping cylinder 1 and fixing one end of the booster ram 40 to fix the booster ram 40 in position with respect to the clamping cylinder 1, the invention is not limited thereto. It is therefore intended that the invention shall extend to all modifications and variations that for example fix the booster ram 40 in position with respect to the clamping cylinder 1 by fixing the booster ram 40 to the base 85.

The preferred embodiment of the invention also has presented the half nut unit 70 or the rotary fastening unit 75 as means for fastening the end of the clamping ram 20 with the moving platen 50. However, the scope of the invention is not limited thereto, but shall include any fastening elements capable of adjusting the length with bolts and nuts.

While preferred embodiment of the invention has described that the moving platen 50 can be guided by the tie bars 65 toward the fixed template 55, the tie bars 65 can be replaced by general guide devices. Further, although the embodiment of the invention has four tie bars 65, the invention can be applied to any type of injection molding machines without tie bars 65.

What is claimed is:

1. A high speed direct mold clamping apparatus of an injection molding machine comprising:
   a clamping cylinder of a uniform inside diameter, the clamping cylinder including an oil channel portion having a plurality of grooved oil channels formed therein and a close contact portion formed of a curved surface leaded to the oil channel portion;
   a clamping ram slidably coupled with the clamping cylinder, and having a first channel for allowing for the flow of oil and a booster cylinder connected to the first channel;
   a booster ram slidably coupled with the booster cylinder of the clamping ram and having a second channel leaded to the booster cylinder;
   a moving platen coupled with one end of the clamping ram;
   a fastening element for coupling the one end of the clamping ram with the moving platen by adjusting the length therebetween;
   a stationary platen installed to be opposed to the moving platen;
   a first port formed in the oil channel portion for the selective flow of oil;
   a second port formed in the close contact portion for the selective flow of oil; and
   means for controlling the flow of oil through the first and the second channels and the first and the second ports;
   wherein the plurality of grooved oil channels are arranged radially in the oil channel portion, wherein the clamping ram has a plurality of coupling projections at one end, and wherein the fastening element includes a pair of half nuts arranged in the moving platen, capable of coupling with and separating from each other, and each having a plurality of coupling grooves therein corresponding to the coupling projections.

2. The high speed direct mold clamping apparatus according to claim 1, wherein the plurality of grooved oil channels are arranged in the oil channel portion at a uniform interval.

3. The high speed direct mold clamping apparatus according to claim 1, wherein the grooved oil channel has a cross section shape selected from a group including arc, rectangle, semicircle and triangle.

4. The high speed direct mold clamping apparatus according to claim 1, wherein the grooved oil channel is gradually reduced at one end with depth to form a transition portion.

5. The high speed direct mold clamping apparatus according to claim 1, wherein the clamping ram has a central ram portion slidably coupled with the clamping cylinder and an O-ring arranged around the central ram portion for sealing function.

6. The high speed direct mold clamping apparatus according to claim 1, further comprising a stationary section for fixing the booster ram and the clamping cylinder in position.

7. The high speed direct mold clamping apparatus according to claim 1, wherein the clamping ram has a central ram portion slidably coupled with the clamping cylinder, a front ram portion and a rear ram portion, the front and rear ram portions having a same outside diameter.

8. The high speed direct mold clamping apparatus according to claim 1, wherein the clamping ram has a central ram portion slidably coupled with the clamping cylinder, a front ram portion and a rear ram portion, wherein the central ram portion has a tapered portion of a width formed adjacent to the front ram portion.

9. The high speed direct mold clamping apparatus according to claim 8, wherein the distance from one end of the close contact portion to the second port therein is smaller than the width of the tapered portion.

10. The high speed direct mold clamping apparatus according to claim 1, wherein the clamping cylinder has a discal front sealing portion for sealing the inside of the clamping cylinder, the front sealing portion having a through hole portion for slidably supporting the clamping ram.

11. The high speed direct mold clamping apparatus according to claim 1, further comprising a position sensor for detecting the position of the moving platen.

12. The high speed direct mold clamping apparatus according to claim 11, wherein the position sensor includes a position detector fixed to the clamping cylinder and a position dog device fixed to the moving platen.

13. The high speed direct mold clamping apparatus according to claim 1, wherein the clamping ram includes a central ram portion slidably contacting the clamping cylinder, a front ram portion extended forward from the central ram portion and a rear ram portion extended backward from the central ram portion, and wherein the booster ram is extended through an end of the rear ram portion outside the clamping cylinder into the clamping ram.

14. The high speed direct mold clamping apparatus according to claim 1, wherein the clamping ram has a central ram portion for slidably contacting the clamping cylinder, a front ram portion and a rear ram portion, and wherein the booster cylinder is arranged within the rear ram portion.

15. A high speed direct mold clamping apparatus of an injection molding machine comprising:
  a clamping cylinder of a uniform inside diameter, the clamping cylinder including an oil channel portion having a plurality of grooved oil channels formed therein and a close contact portion formed of a curved surface leaded to the oil channel portion;
  a clamping ram slidably coupled with the clamping cylinder, and having a first channel for allowing for the flow of oil and a booster cylinder connected to the first channel;
  a booster ram slidably coupled with the booster cylinder of the clamping ram and having a second channel leaded to the booster cylinder;
  a moving platen element coupled with one end of the clamping ram;
  a fastening element for coupling the one end of the clamping rem with the moving platen by adjusting the length therebetween;
  a stationary platen installed to be opposed to the moving platen;
  a first port formed in the oil channel portion for the selective flow of oil;
  a second port formed in the close contact portion for the selective flow of oil; and
  means for controlling the flow of oil through the first and the second channels and the first and the second ports;
  wherein the plurality of grooved oil channels are arranged radially in the oil channel portion, wherein the clamping ram has a plurality of coupling projections at one end, and wherein the fastening element includes a rotatable section arranged in the moving platen and rotatable to an angle, the rotatable section having a through hole for allowing the insertion of the end of the clamping ram and coupling grooves formed radially around the through hole.

16. The high speed direct mold clamping apparatus according to claim 1, wherein the control means control oil to be fed from the first port into the clamping cylinder in a position that the moving platen is coupled with stationary platen.

* * * * *